United States Patent
Guo et al.

(10) Patent No.: US 9,693,228 B2
(45) Date of Patent: Jun. 27, 2017

(54) METHOD, DEVICE AND TERMINAL FOR BINDING NFC APPLICATION AND OPERATOR

(71) Applicant: ZTE CORPORATION, Shenzhen, Guangdong Province (CN)

(72) Inventors: Shuai Guo, Shenzhen (CN); Hongpo Wei, Shenzhen (CN); Kai Wang, Shenzhen (CN); Shengyuan Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/770,193

(22) PCT Filed: Jun. 27, 2013

(86) PCT No.: PCT/CN2013/078191
§ 371 (c)(1),
(2) Date: Aug. 25, 2015

(87) PCT Pub. No.: WO2013/182102
PCT Pub. Date: Dec. 12, 2013

(65) Prior Publication Data
US 2016/0014602 A1    Jan. 14, 2016

(30) Foreign Application Priority Data
Feb. 28, 2013  (CN) .......................... 2013 1 0063847

(51) Int. Cl.
*H04L 29/06*    (2006.01)
*H04W 12/06*    (2009.01)
(Continued)

(52) U.S. Cl.
CPC .......... *H04W 12/06* (2013.01); *H04B 1/3816* (2013.01); *H04L 63/0853* (2013.01); *H04W 4/008* (2013.01)

(58) Field of Classification Search
USPC ............................................. 726/4
See application file for complete search history.

(56) References Cited

U.S. PATENT DOCUMENTS 8,750,514 B2 *  6/2014  Gallo .................... G06Q 10/10
                                                380/270
8,761,665 B2 *  6/2014  Lee ..................... H04M 1/7253
                                                455/41.1
(Continued)

FOREIGN PATENT DOCUMENTS

CN       101013903 A     8/2007
CN       101383017 A     3/2009
(Continued)

*Primary Examiner* — Jason Lee
(74) *Attorney, Agent, or Firm* — Ling Wu; Stephen Yang; Ling and Yang Intellectual Property

(57) ABSTRACT

A method, device and terminal for binding an NFC application and an operator are disclosed in the embodiments of the present document. The method comprises: after receiving an operation command sent by an upper application program of a terminal, an NFC middleware judging whether the operation command is within an NFC service permission opened by the terminal at an operator; when determining that the operation command is within the NFC service permission opened by the terminal at the operator, sending the operation command to an NFC device; the NFC device reading original NFC data according to the information in the operation command; and after performing data processing on the original NFC data, sending the data to the upper application program.

8 Claims, 3 Drawing Sheets

(51) Int. Cl.
*H04W 4/00* (2009.01)
*H04B 1/3816* (2015.01)

(56) References Cited

U.S. PATENT DOCUMENTS

| | | | |
|---|---|---|---|
| 2010/0105322 A1 | 4/2010 | Bertin | |
| 2010/0161410 A1* | 6/2010 | Tulloch | G06Q 30/0246 |
| | | | 705/14.45 |
| 2011/0250839 A1* | 10/2011 | Lee | H04M 1/7253 |
| | | | 455/41.1 |
| 2015/0044964 A1* | 2/2015 | Khan | G06F 21/35 |
| | | | 455/41.1 |

FOREIGN PATENT DOCUMENTS

| | | |
|---|---|---|
| CN | 102187714 A | 9/2011 |
| EP | 1802148 A1 | 6/2007 |
| JP | 2009134722 A | 6/2009 |
| JP | 2010525620 A | 7/2010 |
| JP | 2011065461 A | 3/2011 |
| WO | WO2009050617 A2 | 4/2009 |

* cited by examiner

METHOD, DEVICE AND TERMINAL FOR BINDING NFC APPLICATION AND OPERATOR

TECHNICAL FIELD

The invention relates to the field of communication technology, particularly to a method, device and terminal for binding a Near Field Communication (NFC) application and an operator.

BACKGROUND OF THE RELATED ART

NFC middleware is middle layer software between an NFC application and an underlying platform, and is responsible for providing a common platform for the development of NFC-related applications. It can shield differences between hardware and system software, and integrate all kinds of common features that NFC applications need into the middleware, to provide a unified interface for the third party that develops NFC applications. A current typical NFC middleware is shown in FIG. 1.

The rise of NFC technology provides a broad space for development in fields such as e-payment, online security verification, mobile computing, real-time data collection, location information distribution. It also stimulates benefit game between mobile operators and NFC device manufacturers, financial institutions. Therefore, operators not only need the middleware on intelligent terminals that can provide lightweight and universal services for upper layer NFC applications, to shield heterogeneity and complexity of underlying NFC devices, but also expect the middleware can bind specific NFC applications with mobile operators, so that only users that get operator-related permissions can use NFC devices of intelligent terminals. Therefore, how to bind NFC applications with mobile operators is the problem that needs to be solved urgently.

SUMMARY

In view of the above analysis, embodiments of the present document aim at providing a method, device and terminal for binding an NFC application and an operator, to realize the binding between the NFC application and the mobile operator.

The present document provides a method for binding an NFC application and an operator, comprising:

After receiving an operation command sent by an upper application program of a terminal, an NFC middleware judging whether the operation command is within an NFC service permission opened by the terminal at an operator; when determining that the operation command is within the NFC service permission opened by the terminal at the operator, sending the operation command to an NFC device;

The NFC device reading original NFC data according to information in the operation command; and sending the data to the upper application program after performing data processing on the original NFC data.

Preferably, after receiving the operation command sent by the upper application program of the terminal, the NFC middleware analyzes and processes the operation command, parses out a type of an NFC operation from the operation command; based on the type of NFC operation, judges whether the operation command is within the service permission of the operator.

Preferably, the type of the NFC operation comprises: e-payment, online security verification, mobile computing, real-time data collection, or location information distribution.

Preferably, the method further comprises:

The NFC middleware getting the service permission opened by the terminal at the operator based on personal information in a SIM card of the terminal.

Preferably, the step of the NFC middleware sending the data to the upper application program after performing data processing on the original NFC data, comprises:

the original NFC data, on which data verification, data filtering, data analysis and data processing are performed, being sent to the upper application program.

Embodiments of the present document also provide a device for binding an NFC application and an operator, comprising:

a processing unit, configured to: receive an operation command from an upper application program of a terminal and receive original NFC data sent by an NFC device, and after performing data processing on the original NFC data, send the data to the upper application program;

a user permission verification unit, configured to: judge whether the operation command received by the processing unit is within an NFC service permission opened by the terminal at an operator; when determining that the operation command is within the NFC service permission opened by the terminal at the operator, sending the operation command to the NFC device.

Preferably, the processing unit is configured to: receive the operation command from the upper application program of the terminal, analyze and process the operation command to parse out a type of an NFC operation; receive original data sent by the NFC device, and after performing data process on the original NFC data, send the data to the upper application program;

the user permission verification unit is configured to: based on the type of the NFC operation parsed out by the processing unit, judge whether the operation command is within the service permission of the operator; when determining the type of the NFC operation is within the service permission opened by the terminal at the operator, send the operation command to the NFC device.

Preferably, the user permission verification unit is further configured to: get the service permission opened by the terminal at the operator based on personal information in a SIM card of the terminal.

Preferably, the user permission verification unit is configured to: receive the operation command from the upper application program of the terminal, analyze and process the operation command to parse out the type of the NFC operation from the operation command; receive the original NFC data sent by the NFC device, perform data verification, data filtering, data analysis and data processing on the original NFC data and send to the upper application program.

Embodiments of the present document also provide a terminal, which comprises any of the above devices for binding an NFC application and an operator.

Embodiments of the present provide a method, device and terminal for binding an NFC application and an operator. By analyzing and processing a received operation command, the type of the NFC operation is parsed out. Based on the type of the NFC operation, it is to judge whether the operation command is within an NFC service permission opened by the terminal at an operator, and when determining that the operation command is within the NFC service permission opened by the terminal at the operator, it is to perform the operation command, so that only users that get operator-related permission can use the NFC device of the terminal, thus realizing the binding between the NFC application and the operator.

PREFERRED EMBODIMENTS OF THE INVENTION

In the following, in combination with the figures, it is to describe in details the preferred embodiments of the present document, wherein, the figures form a part of the application and are used to explain the principle of the present document together with embodiments of the present document. For the purpose of clarity and simplicity, when it may obscure the subject of the present document, the detailed description of the known function and structure in the device described in this paper will be omitted. Without conflict, embodiments of the present document and the characteristics of the embodiments can be combined with each other.

Embodiment 1

Figure 1:
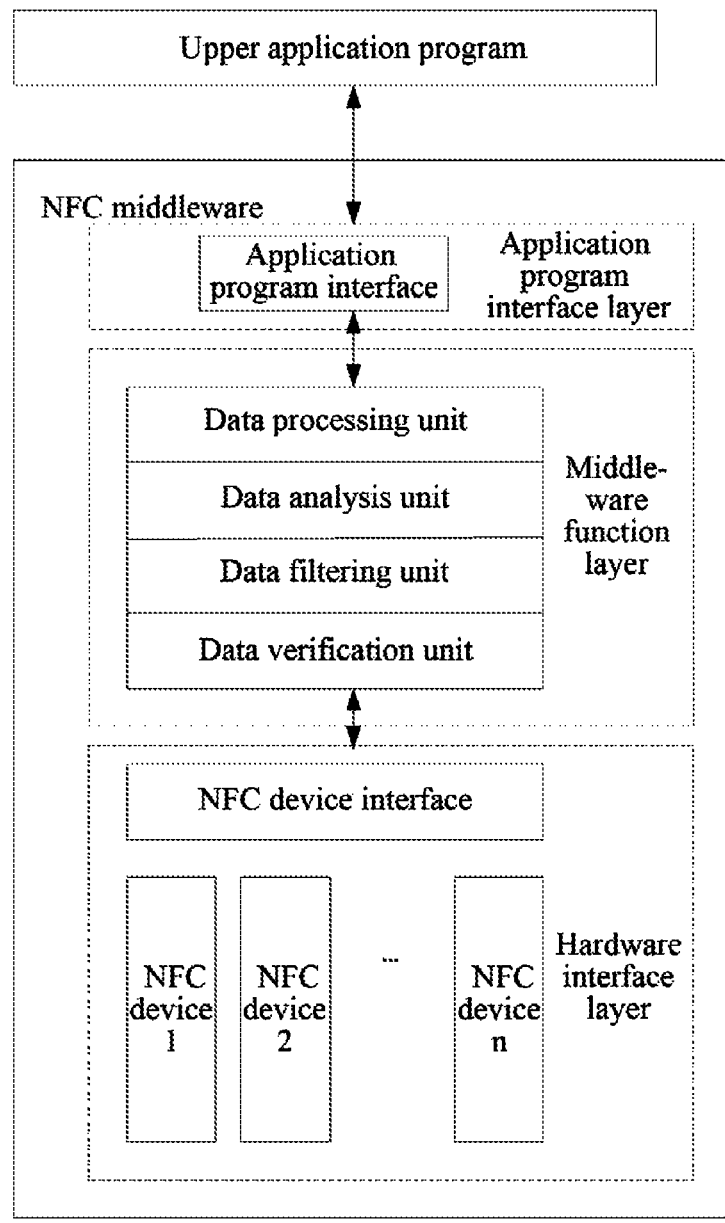
FIG. 1 is a structural diagram of an NFC middleware of related technologies.
Figure 2:
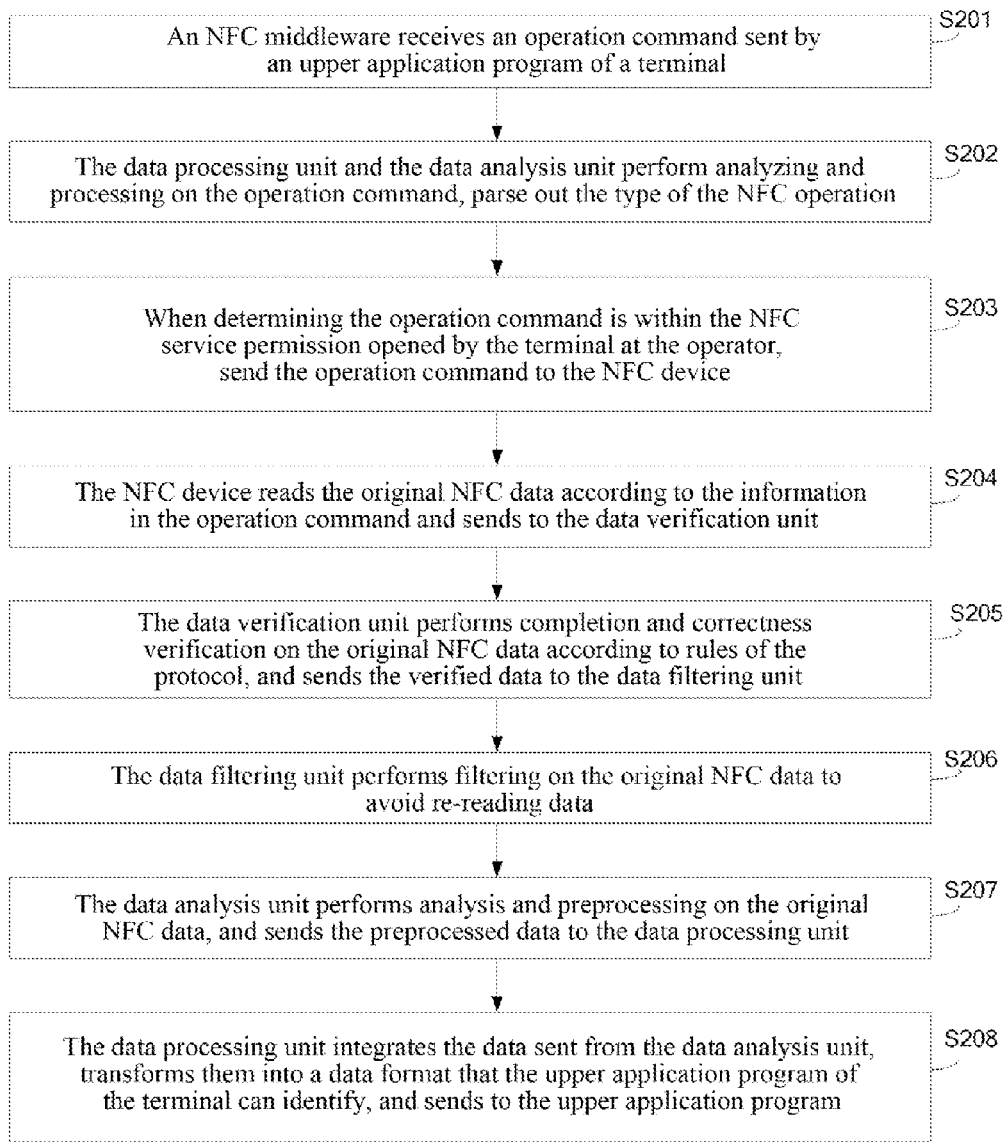
FIG. 2 is a flowchart of the method for binding an NFC application and an operator in embodiment 1 of the present document.
Figure 3:
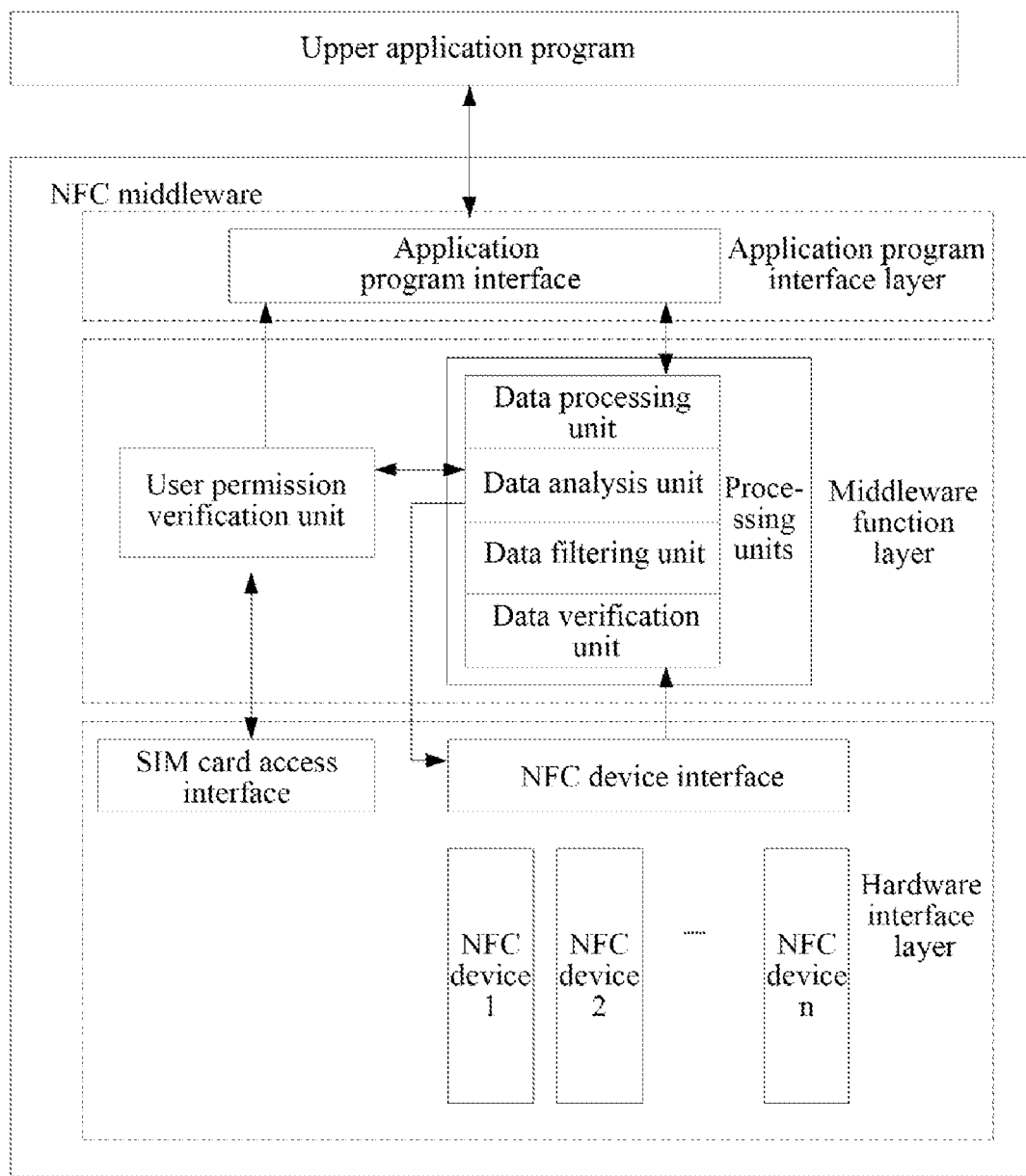
FIG. 3 is a structural diagram of an NFC middleware in embodiments 1 and 2 of the present document.

Embodiments of the present document provide a method for binding an NFC application and an operator, as is shown in FIG. 2 and FIG. 3, the method comprises:

In S201, an NFC middleware receives an operation command sent by an upper application program of a terminal;

In S202, a data processing unit and a data analysis unit perform analysis and processing on the operation command, parse out the type of the NFC operation;

In S203, a user permission verification unit gets the service permission opened by the terminal at an operator based on personal information in the terminal SIM card, and judges whether the operation command is within the service permission of the operator based on the type of NFC operation parsing out in the processing unit; when determining the operation command is within the service permission opened by the terminal at the operator, sends the operation command to an NFC device.

The type of the NFC operation in embodiments of the present document comprises: e-payment, online security verification, mobile computing, real-time data collection, or location information distribution.

In S204, the NFC device reads the original NFC data according to the information in the operation command and sends to the data verification unit;

In S205, the data verification unit performs completion and correctness verification on the original NFC data according to rules of the protocol, and sends the verified data to a data filtering unit;

In S206, the data filtering unit performs filtering on the original NFC data to avoid re-reading data;

In S207, the data analysis unit performs analysis and preprocessing on the original NFC data, and sends the preprocessed data to the data processing unit;

In S208, the data processing unit integrates the data sent from the data analysis unit, transforms them into a data format that the upper application program of the terminal can identify, and sends to the upper application program.

Embodiments of the present provide a method for binding an NFC application and an operator. By analyzing and processing a received operation command, it is to parse out the type of the NFC operation. Based on the type of the NFC operation, it is to judge whether the operation command is within an NFC service permission opened by the terminal at an operator, and when determining that the operation command is within the NFC service permission opened by the terminal at the operator, it is to perform the operation command, so that only users that get operator-related permission can use the NFC device of the terminal, thus realizing the binding between the NFC application and the operator.

Embodiment 2

Embodiments of the present document provide a device for binding an NFC application and an operator, as is shown in FIG. 3, which comprises:

A processing unit, configured to: receive an operation command from an upper application program of a terminal, analyze and process the operation command to parse out the type of NFC operation; receive original data from the NFC device, perform data verification, data filtering, data analysis and data processing on the original NFC data and then send the data to the upper layer application program;

a user permission verification unit, configured to: get the service permission opened by the terminal at an operator based on personal information in the terminal SIM card; based on the type of NFC, judge whether the operation command is within the service permission of an operator; when determining the type of the NFC operation is within the service permission opened by the terminal at the operator, send the operation command to the NFC device.

Embodiment 3

Embodiments of the present document also provide a terminal, which comprises any of the devices for binding an NFC application and an operator in the above embodiments.

In another embodiment, a kind of software is further provided, which is used to implement the technical schemes described in the aforesaid embodiments and preferred embodiments.

In another embodiment, a storage medium is further provided, which stores the above software, the storage medium comprises but is not limited to compact disc, a floppy disk, hard disk, EPROM, etc.

Obviously, those skilled in the art should understand that each module or step described above of the present document can be achieved by a universal computing device; they can be integrated on a single computing device or be distributed across a network composed of a multiple computing devices. Optionally, they can be implemented with program codes executable by a computing device. Thus, they can be stored in the storage device and implemented by a computing device, and under certain conditions, the steps illustrated or described can be executed with an order different from here, or they can be made into various IC modules, or various modules or steps therein can be made in a single integrated circuit. Thus, the present document is not limited to any specific combination of hardware and software.

The above is only preferred embodiments of the present document, but the protection scope of the present document is not limited to this. Any changes or replacements that can be easily raised up by the skilled in the art who are familiar with the field of the present document should fall into the scope of the present document. Therefore, the protection scope of the present document should be subject to claims.

INDUSTRIAL APPLICABILITY

With the embodiments of the present document, the users that get operator-related permission can use the NFC device of the terminal, thus realizing the binding between the NFC application and the operator.

What is claimed is:

1. A method for binding a Near Field Communication (NFC) application with an operator, comprising:
    receiving, by an NFC middleware, an operation command sent by an upper application program of a terminal, analyzing and processing the operation command to parse out the type of the NFC operation from the operation command;
    receiving, by the NFC middleware, the original NFC data sent by a NFC device, performing data verification, data filtering, data analysis and data processing on the original NFC data; and after performing data processing on the original NFC data, sending the NFC data to the upper layer application program;
    getting, by the NFC middleware, the NFC service permission opened by the terminal at the operator based on personal information in a SIM card of the terminal;
    judging, by the NFC middleware, whether the operation command is within an NFC service permission opened by the terminal at an operator; when determining that the operation command is within the NFC service permission opened by the terminal at the operator, sending the operation command to an NFC device of the terminal;
    thereby only users that get the NFC service permission of the terminal at the operator can use the NFC device of the terminal.

2. The method of claim 1, wherein, the step of judging whether the operation command is within the NFC service permission opened by the terminal at the operator, comprises:
    based on the type of the NFC operation parsed out by the processing unit, judging whether the operation command is within the NFC service permission of the operator.

3. The method of claim 1, wherein, the type of the NFC operation comprises: e-payment, online security verification, mobile computing, real-time data collection, or location information distribution.

4. A device for binding an NFC application and an operator, comprising a hardware processor and a non-transitory storage medium storing machine readable instructions that when executed by the hardware processor cause the hardware processor to perform the steps in following units:
    a processing unit, configured to: receive an operation command from an upper application program of a terminal, analyze and process the operation command to parse out the type of the NFC operation from the operation command;
    receive the original NFC data sent by the NFC device, perform data verification, data filtering, data analysis and data processing on the original NFC data; and after performing data processing on the original NFC data, send the NFC data to the upper layer application program; and
    a user permission verification unit, configured to: judge whether the operation command received by the processing unit is within an NFC service permission opened by the terminal at an operator; when determining that the operation command is within the NFC service permission opened by the terminal at the operator, sending the operation command to the NFC device of the terminal;
    the user permission verification unit is further configured to: get the NFC service permission opened by the terminal at the operator based on personal information in a SIM card of the terminal;
    thereby only users that get the NFC service permission of the terminal at the operator can use the NFC device of the terminal.

5. The device of claim 4, wherein,
    the user permission verification unit is configured to: based on the type of the NFC operation parsed out by the processing unit, judge whether the operation command is within the NFC service permission of the operator; when determining the type of the NFC operation is within the NFC service permission opened by the terminal at the operator, send the operation command to the NFC device.

6. The device of claim 4, wherein the device is comprised in the terminal.

7. A non-transitory storage medium, comprising machine readable instructions that when executed by a hardware processor cause the hardware processor to perform the steps in following units:
    a processing unit, configured to: receive an operation command from an upper application program of a terminal, analyze and process the operation command to parse out the type of the NFC operation from the operation command;
    receive the original NFC data sent by the NFC device, perform data verification, data filtering, data analysis and data processing on the original NFC data; and after performing data processing on the original NFC data, send the NFC data to the upper layer application program; and
    a user permission verification unit, configured to: judge whether the operation command received by the processing unit is within an NFC service permission opened by the terminal at an operator; when determining that the operation command is within the NFC service permission opened by the terminal at the operator, sending the operation command to the NFC device of the terminal;
    the user permission verification unit is further configured to: get the NFC service permission opened by the terminal at the operator based on personal information in a SIM card of the terminal;
    thereby only users that get the NFC service permission of the terminal at the operator can use the NFC device of the terminal.

8. The storage medium of claim 7, wherein,
    the user permission verification unit is configured to: based on the type of the NFC operation parsed out by the processing unit, judge whether the operation command is within the NFC service permission of the operator; when determining the type of the NFC operation is within the NFC service permission opened by the terminal at the operator, send the operation command to the NFC device.

\* \* \* \* \*